United States Patent [19]
Kaiser

[11] Patent Number: 4,483,657
[45] Date of Patent: Nov. 20, 1984

[54] WIND TURBINE ROTOR ASSEMBLY

[76] Inventor: Heinz W. Kaiser, 90130 Prairie Rd., Eugene, Oreg. 97402

[21] Appl. No.: 427,593

[22] Filed: Sep. 29, 1982

[51] Int. Cl.[3] .................................................. F03D 7/06
[52] U.S. Cl. ........................................ 416/51; 416/119
[58] Field of Search .............. 416/17, 111, 119, 44 A, 416/50 A, 51 A, 52 A, 53, 19

[56] References Cited

U.S. PATENT DOCUMENTS

| | | | |
|---|---|---|---|
| 457,272 | 8/1891 | Hall | 416/119 X |
| 498,068 | 5/1893 | Lonning | 416/52 A X |
| 1,422,602 | 7/1922 | Morris | 416/50 A |
| 1,524,712 | 2/1925 | Hurd | 416/140 |
| 1,542,433 | 6/1925 | Zgliczynski | 416/50 A |
| 1,592,242 | 7/1926 | Welsch | 416/153 |
| 1,633,428 | 6/1927 | Zgliczynski | 416/44 A |
| 1,754,698 | 4/1930 | Schlotzhauer | 416/50 A |
| 1,794,930 | 3/1931 | Spencer | 416/50 A X |
| 1,835,018 | 12/1931 | Darrieus . | |
| 2,247,929 | 7/1941 | Terhune | 416/50 A X |
| 3,918,839 | 11/1975 | Blackwell et al. | 416/175 |
| 4,052,134 | 10/1977 | Rumsey | 416/119 |
| 4,130,380 | 12/1978 | Kaiser | 416/197 A |

FOREIGN PATENT DOCUMENTS

| | | | |
|---|---|---|---|
| 2481756 | 11/1981 | France | 416/140 R |
| 2082260 | 3/1982 | United Kingdom | 416/119 |

*Primary Examiner*—Everette A. Powell, Jr.
*Attorney, Agent, or Firm*—James D. Givnan, Jr.

[57] ABSTRACT

A vertical axis wind turbine having a horizontal arm member which supports an upright blade assembly. Bearing structure coupling the blade assembly to the turbine arm permits blade movement about its longitudinal axis as well as flexing motion of the blade assembly about axes perpendicular to the longitudinal axis. A latching mechanism automatically locks the blade assembly to its supporting arm during normal turbine operation and automatically unlocks same when the turbine is at rest. For overspeed prevention, a centrifugally actuated arm functions to unlatch the blade assembly permitting same to slipstream or feather into the wind. Manually actuated means are also provided for unlatching the moving blade assembly. The turbine arm additionally carries a switching mechanism in circuit with a turbine generator with said mechanism functioning to open and hence protect the generator circuit in the event of an overspeed condition of the turbine.

11 Claims, 10 Drawing Figures

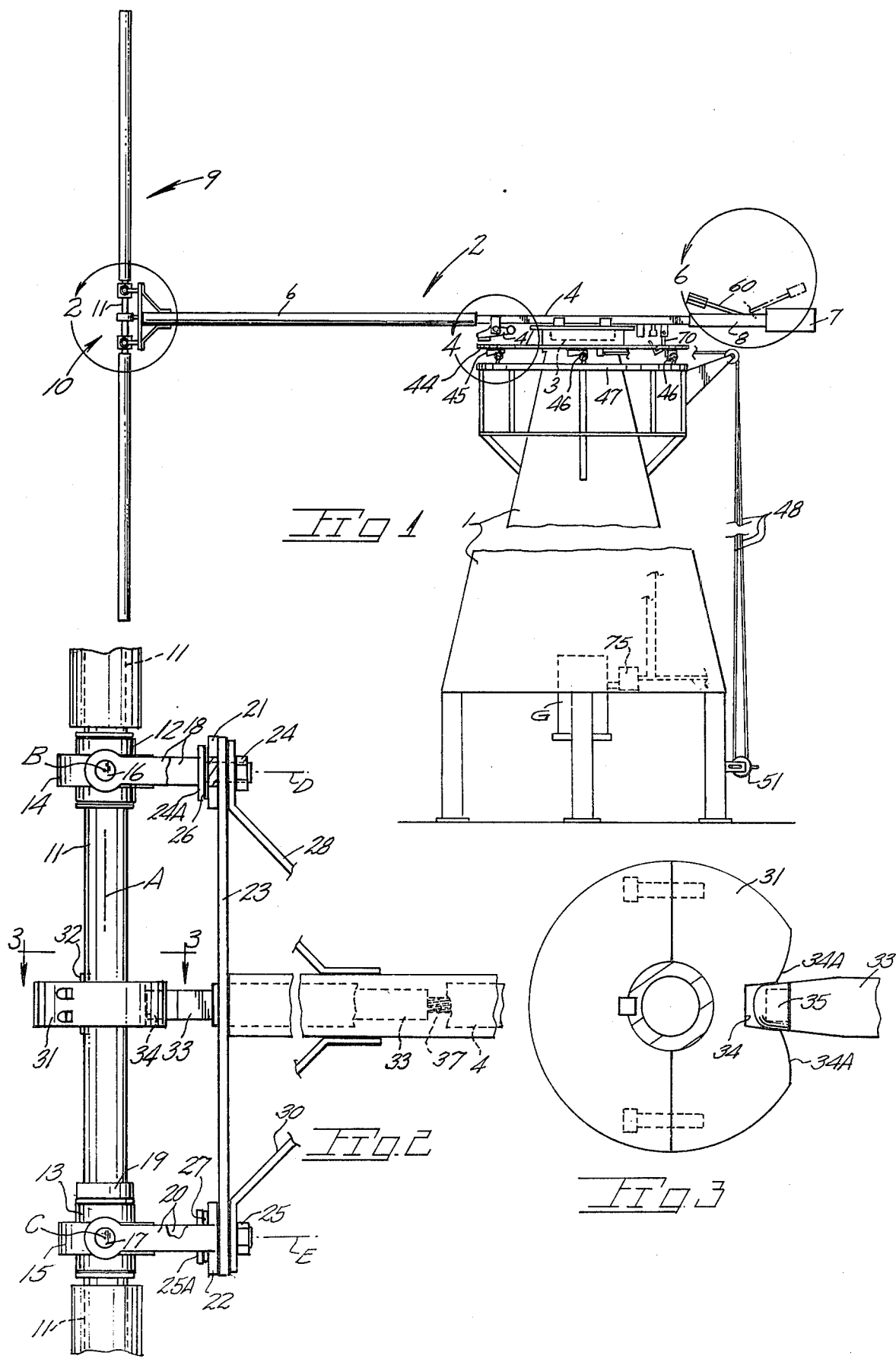

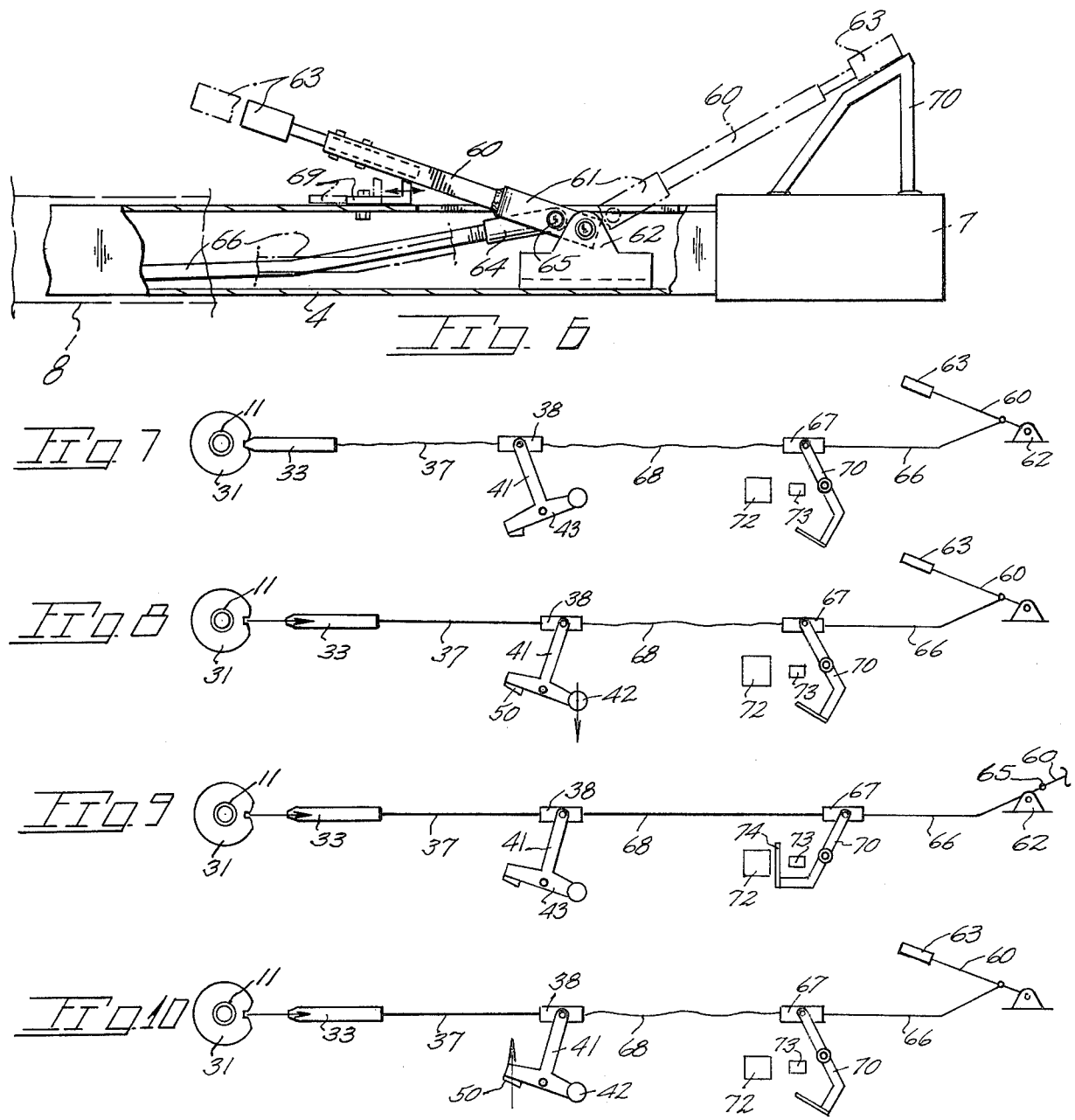

WIND TURBINE ROTOR ASSEMBLY

BACKGROUND OF THE INVENTION

The present invention pertains generally to wind turbines of the type having generally upright blade components which rotate about a turbine vertical axis.

Examples of the vertical axis wind turbine are found in U.S. Pat. No. 1,835,018 to Darrieus, and U.S. Pat. No. 4,130,380 issued to the present inventor. U.S. Pat. No. 3,918,839 also discloses a vertical axis wind turbine.

A serious problem exists in known wind turbine designs which problem arises during greater than ordinary wind speeds which results in an overspeed condition of the turbine. Mechanical as well as electrical damage may occur by reason of the fact that control systems fail to control turbine rotor speed to keep same within acceptable limits. Where the wind turbine is used to generate electrical power, overspeed conditions are extremely undesirable by reason of damage to costly generating components which often must be replaced in their entirety rather than repaired.

SUMMARY OF THE PRESENT INVENTION

The present invention is embodied within a rotor assembly of a vertical axis wind turbine and enables positive control of rotor speed without reliance on motor driven control components.

The present rotor assembly includes a blade assembly disposed in an upright manner for rotation about the turbine's vertical axis with the blade being of airfoil cross section. A rotor assembly arm carries the blade assembly and mounts same on a supporting tower having suitable arm support structure. At the arm and blade juncture, a bearing structure is provided which permits the blade to move about multiple axes relative the arm end. Provision is made for locking the blade assembly with respect to rotation of same about its lengthwise axis for the purpose of maintaining the chord of the blade normal to the rotor assembly arm during turbine operation. Such a locked relationship is associated with an operative mode while, in an unlocked condition, the blade may feather or slipstream into the prevailing wind. Additional provision is made permitting movement of the blade assembly spar relative its supporting arm which results from bending loads imparted to the central segment of the blade spar.

The rotor assembly includes an automatic overspeed control actuated by centrifugal forces on the rotor assembly and which, when actuated, unlocks the blade assembly to permit same to feather or "weathervane" into the wind. Upon unlocking of the blade, the same may swing freely about its major or lengthwise axis to avoid imparting movement to the rotor arm as well as to avoid exposing the blade to severe wind loading. Provision is made for a secondary or back-up blade unlocking system which is actuated manually. This latter system is entirely manual to avoid dependence on electrically powered components.

The above mentioned automatic overspeed control is coupled to a circuit breaking device, such as a photocell, to interrupt the flow of electric current to the turbine generator.

Provision is made for unlocking of the rotor blade when the rotor assembly is parked while, oppositely, initial locking of the blade and arm occurs in the presence of a small centrifugal force during initial rotor rotation by a starter motor which may serve as a turbine generator at elevated rotor assembly speeds.

Important objectives include the provision of a rotor assembly for a vertical axis turbine wherein a rotor arm beam and the upright blade component of a rotor assembly may be locked during static and normal operation and unlocked for blade feathering during high wind speed periods in a positive manner without reliance on powered accessory systems which are susceptible to malfunction; the privision of a rotor assembly incorporating a centrifugally actuated unlatching member operable upon a predetermined centrifugal force value being present exerted during a rotor overspeed condition; the provision of a blade and rotor latching mechanism which in addition to providing automatic locking and unlocking between the rotor arm beam and blade includes the back-up cpability of permitting manual unlocking or feathering of the blade to avert an overspeed condition; the provision of a bearing structure which permits an upright blade of the turbine to rotate to a feathered state relative its supporting arm.

BRIEF DESCRIPTION OF THE DRAWINGS

In the accompanying drawings:

FIG. 1 is a side elevational view of a rotor assembly in place on a supporting tower;

FIG. 2 is an enlarged detailed view of bearing structure encircled at 2 in FIG. 1;

FIG. 3 is a horizontal sectional view taken downwardly along line 3—3 of FIG. 2 and showing a blade latch details;

FIG. 6 is an enlarged detailed view of an automatic unlatching mechanism encircled at 6 in FIG. 1; and FIGS. 7 through 10 are schematic views of blade latching details in different modes.

DETAILED DESCRIPTION OF THE PREFERRED EMBODIMENT

Figure 4:
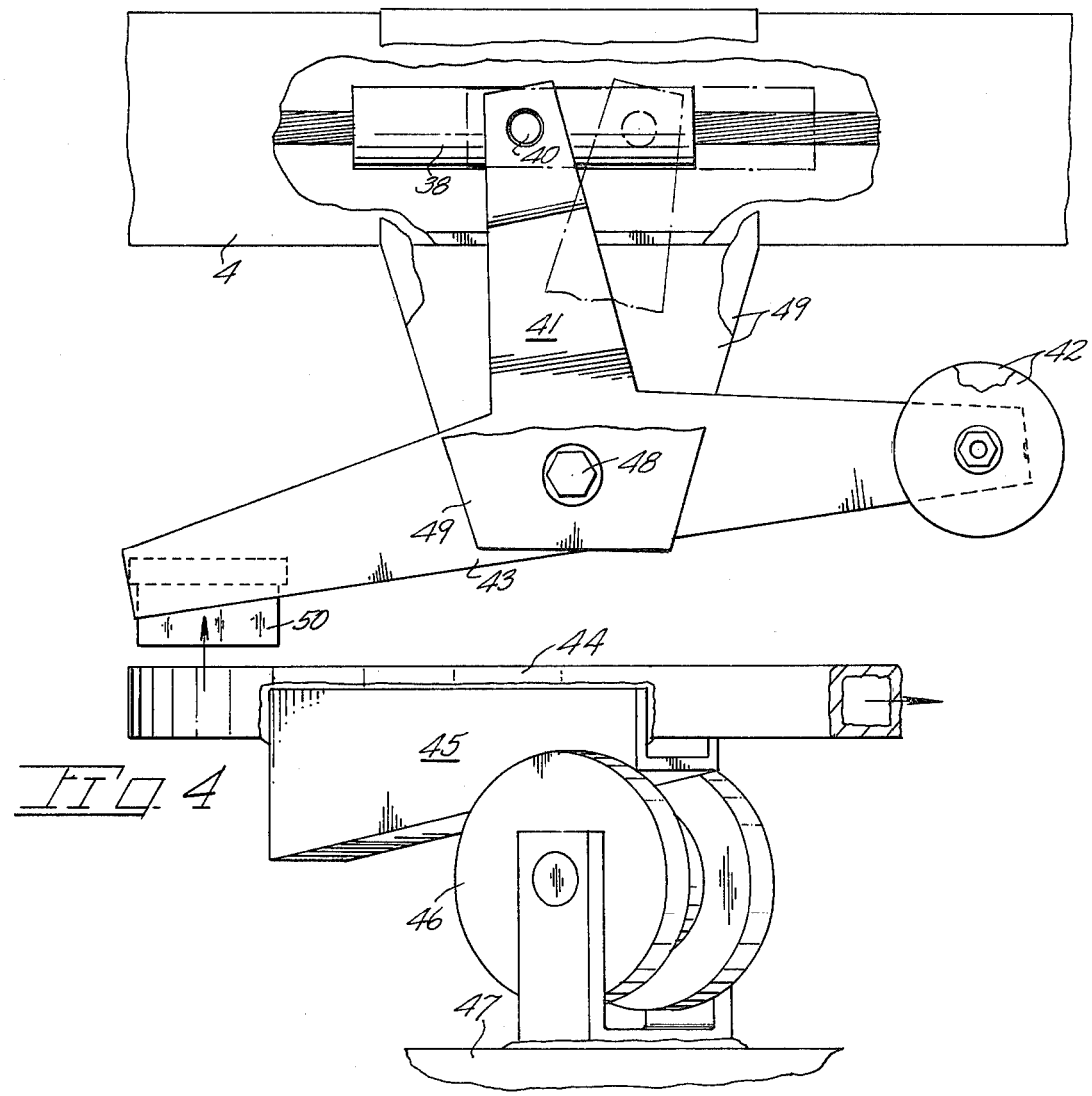
FIG. 4 is an enlarged detailed view of a latch actuating mechanism of the rotor arm structure encircled at 4 in FIG. 1.

In the drawings, the reference numeral 1 indicates a tower structure which supports in an elevated manner the present rotor assembly indicated generally at 2. A turntable at 3 of the tower structure is suitably supported so as to bear both radial and axial loads imparted by the rotor assembly.

Rotor assembly 2 includes a horizontal beam member 4 of tubular construction extending sugstantially the rotor assembly length. A horizontal airfoil 6 with a leading edge 5 extends along the rotor main beam member 4 while the remote end segment of the beam member carries a counterweight at 7. A secondary horizontal airfoil is at 8.

As best viewed in FIGS. 1, 2 and 3, an upright blade assembly generally at 9 is coupled to an end of main beam member 4 by means of a bearing structure indicated generally at 10.

Blade 9 comprises a spar 11 extending the blade length with said spar being of tubular construction serving to support airfoil shaped ribs affixed thereto. It has been found desirable to form blade 9 of lightweight materials such as forming spar 11 from extruded aluminum tubing with metal ribs attached thereto at spaced apart intervals with symmetrical airfoil styrofoam ribs stacked therebetween.

Indicated at 12 and 13 are upper and lower bearing assemblies which couple spar 11 to the main horizontal rotor member so as to permit blade movement about its major axis A when unlocked by a later described latch. Bearing 13 additionally supports spar 11 against axially directed static loads by supporting a thrust ring 19. Each bearing assembly additionally includes upper and lower rings at 14 and 15 with each ring having a pair of trunnions at 16 and 17 received within apertured U-shaped bracket 18 and 20 to permit additional spar movement about axes B and C. Brackets 18 and 20 each includes a web member at 21 and 22 which are coupled to upright arm end plate 23 by fastener assemblies at 24 and 25 each including an enlarged head 24A, 25A with an underlying friction resistant washer at 26 and 27. Accordingly, the upper and lower bearings may additionally and independently permit spar flexure about axes D and E. Each bearing assembly permits spar movement about three intersecting axes. Upper and lower braces are at 28 and 30.

Spar 11 is provided with a blade latching mechanism component in a locking ring 31 keyed at 32 to the spar. A latch member 33 is slidably housed within the outer end of beam member 4 for seated engagement with a recess 34 formed in said locking ring 31 with converging wall surfaces 34A facilitating latch seating. A latch insert at 35 is of a synthetic resin polymer to reduce friction.

With attention to FIG. 4, a latch actuating mechanism is shown with a cable segment at 37 constituting part of coupling means joining same to the inner end of latch 33. A sleeve 38 is fixed to the cable segment of the coupling means within beam member 4 and carries a pair of trunnions 40 which pivotally receive the clevis-shaped upper end of an arm 41 in a bracket 49. Axial movement is imparted to the cable segment by counterweights at 42 carried at the end of a lever 43 integral with said arm. With the turbine static in a no or low wind condition, counterweights 42 are of a weight to cause movement of arm 41 about a pivot 48 to the broken line position of FIG. 4 or to the latch releasing position where latch 33 is extracted from ring engagement. Such a condition is shown schematically in FIG. 8 with an arrow representing a gravitational unlatching force.

Arm 41 additionally serves as a manual unlatching system component which system includes a lever actuator shown as a ring 44 fitted with ramp structures 45 in movable supported placement on roller 46 fixed in place on a tower railing 47. Rotational movement is imparted to ring 44 by a cable control 48 (FIG. 1) which has its ends tangentially attached at diametric points on ring 44 whereby the ring is elevated to contact a lever mounted shoe 50 as the ring and attached ramps 45 ride upwardly on tower mounted rollers 46. A cable winch 51 is equipped with a lock (not shown) to retain the cable runs and ring 44 in the raised position when desired. Accordingly, a back-up or manual unlatching system is provided which does not rely on electrical or other power sources susceptible to failure. The back-up unlatching system is operable at any rotor speed or with the turbine parked and is shown schematically in operation in FIG. 10.

An automatic unlatching system includes, as best shown in FIG. 6, weight equipped lever means 60 having a clevis-shaped lower end 61 swingably mounted within a bracket 62 in place on beam member 4. A weight 63 is adjustably carried in the lever end and acted upon by centrifugal force during rotor assembly rotation. Pivotally carried within clevis 61 is connector 64 on a pin 65 with said connector receiving one end of a control rod 66 comprising part of the coupling means. In the presence of centrifugal forces associated with an overspeed condition, the lever 60 will move to the FIG. 6 broken line position to cause control rod 66, a connector sleeve 67 and an attached cable segment at 68 of the coupling means to be repositioned to the right per FIG. 9 to exert a retracting or unlatching force on latch 33. Cable segments 66–68 provide a lost motion coupling with lever means 60. The rotor counterweight at 7 is equipped with a force absorbing support 70 against which weight 63 impacts. A lever positioner at 69 prepositions the lever 60 in an adjustable manner to vary the speed at which movement will occur.

Figure 5:
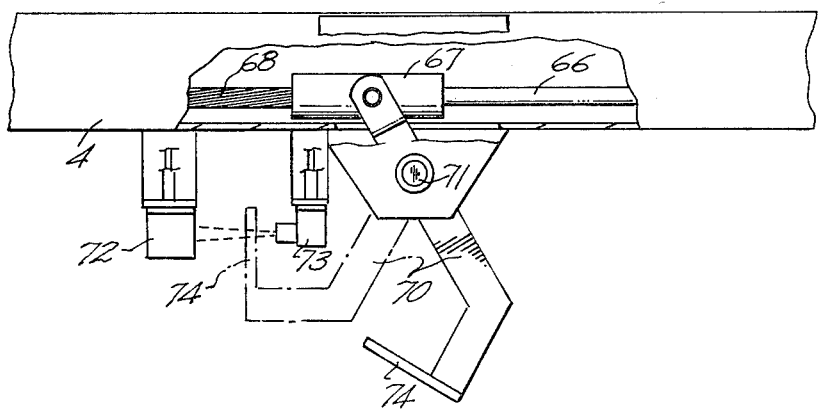
FIG. 5 is an enlarged side elevational view of a rotor arm segment on which is mounted circuit interrupting means including a photocell.

Control rod 66 when shifted by lever 60 repositions sleeve 67 as above noted and with reference to FIG. 5 causes an arm 70 of circuit interrupting means to swing about a pivot pin 71 to interpose an arm carried barrier 74 between a reflector 72 and a photocell 73. Photocell 73 is in circuit with a relay 75 (FIG. 1) through which an electrical generator G is supplied with electrical current. Accordingly, the circuit to the generator is interrupted to protect the generator from damage during overspeed conditions by reason of a current supply to the generator being interrupted by relay switching at the predetermined rotor overspeed point by the automatic operation of lever means 60 and associated control rod.

Turbine operation is initiated by rotation of the rotor assembly by the generator now functioning as a motor at low rotor assembly speeds. Centrifugal force acting on latch 33 will urge same into engagement with locking ring 31, per FIG. 7, which ring will move with the blade assembly about blade axis A as the rotor arm makes its initial rotations about the tower structure.

The present rotor assembly is usable in multi-stage wind turbines such as that type shown in my earlier mentioned U.S. Pat. No. 4,130,380.

While I have shown but one embodiment of the invention it will be apparent to those skilled in the art that the invention may be embodied still otherwise without departing from the spirit and scope of the invention.

Having thus described the invention, what is desired to be secured under a Letters Patent is:

I claim:

1. A rotor assembly for a vertical axis wind turbine having a motor powering initial rotor assembly movement, said rotor assembly comprising,
   a horizontal beam member adapted to be rotatably supported by the turbine,
   a blade assembly disposed adjacent one end of said beam member and having an upright blade,
   a bearing structure coupling a mid-portion of said blade assembly to the horizontal beam member and permitting blade movement about multiple axes including feathering movement about the blade major axis,
   a blade latching mechanism on said beam member including a latch member actuated by centrifugal force and normally maintaining the blade and said beam member in a fixed relationship during rotor assembly travel whereby differential air pressures acting on the blade surfaces will impart lift and hence rotation to the rotor assembly, said latch member inoperable when the rotor assembly is static to permit feathering of the blade into the wind, said latch member responsive to centrifugal force to engage the blade assembly during initial motor driven movement of the rotor assembly during turbine starting, a latch actuating mechanism biasing said latch member out of engagement with said blade when the rotor assembly is static, said latch actuating mechanism also adapted to disengage the latch member from the blade during operation of the rotor assembly to prevent a rotor assembly over speed condition, centrifugally actuated lever means carried by said horizontal beam member and momentarily responsive to centrifugal forces of the magnitude generated at the upper limits of acceptable rotor assembly speed, and means coupling said centrifugally actuated lever means and said latch actuating mechanism to said latch member to actuate the latter to permit the blade to rotate about its major axis within said bearing means to assume a feathered position in the presence of excessive wind speeds to stop rotor assembly movement.

2. The rotor assembly claimed in claim 1 wherein said latch actuating mechanism additionally includes manually actuated arm means mounted on said horizontal beam member, said coupling means coupling said arm means to said latch member whereby the latter may be actuated to disengage the blade for feathering same.

3. The rotor assembly claimed in claim 2 wherein said centrifugally actuated lever means and said arm means function individually to impart lengthwise movement to said coupling means and said latch member for unlatching of the blade assembly.

4. The rotor assembly claimed in claim 2 additionally including a manually positionable ring member movably mounted below said beam member and contactable with said arm means to impart movement thereto and to the coupling means and ultimately to said latch member to disengage the latter from the blade.

5. The rotor assembly claimed in claim 1 wherein said bearing structure comprises a pair of bearing assemblies upporting said blade at spaced apart points oppositely disposed from the latch member and each bearing assembly permitting blade movement about multiple axes to prevent binding of the blade when the blade is distorted.

6. The rotor assembly claimed in claim 1 additionally including a circuit interrupting device, said device in circuit with a relay in a turbine generator power supply circuit said circuit interrupting device including an arm actuated by said coupling means.

7. The rotor claimed in claim 2 wherein said coupling means includes elongate flexible segments to permit independent lost motion functioning of said centrifugally actuated lever means and said latch actuating means.

8. The rotor assembly claimed in claim 6 wherein said coupling means additionally includes a rigid elongate member, said circuit interrupting device coupled to said rigid elongate member and actuated thereby.

9. The rotor assembly claimed in claim 3 wherein said arm means includes an arm mounted weight so as to effect unlatching of the blade automatically by gravity acting on said weighted arm when the rotor assembly is static.

10. The rotor assembly claimed in claim 1 wherein said horizontal beam member is tubular, said coupling means housed within said beam member to reduce beam member drag.

11. The rotor assembly claimed in claim 10 wherein said latch member is housed within said beam member.

* * * * *